United States Patent
Gmeilbauer

[11] Patent Number: 6,035,505
[45] Date of Patent: Mar. 14, 2000

[54] MOUNTING CLAMP FOR HOLDING TOGETHER METAL SHEETS AND A TOOL FOR REMOVING THE CLAMP

[76] Inventor: Engelbert Gmeilbauer, Stocketweg 1, Seefeld 82229, Germany

[21] Appl. No.: 09/054,816

[22] Filed: Apr. 3, 1998

Related U.S. Application Data

[62] Division of application No. 08/629,833, Apr. 10, 1996, Pat. No. 5,934,660.

[30] Foreign Application Priority Data

Dec. 5, 1995 [DE] Germany ............... 295 19 262 U

[51] Int. Cl.[7] ............... B25B 1/00; B23P 11/00
[52] U.S. Cl. ............ 29/243.56; 29/270; 29/278; 29/283; 269/254 R
[58] Field of Search ............ 29/243.56, 235, 29/239, 270, 278, 283; 81/485, 489; 269/254 R

[56] References Cited

U.S. PATENT DOCUMENTS

| D. 136,737 | 11/1943 | Woock . | |
|---|---|---|---|
| D. 141,638 | 6/1945 | Oen . | |
| 805,666 | 11/1905 | Regenier et al. | 140/102.5 |
| 1,990,583 | 2/1935 | Dickinson | 140/102.5 |
| 2,195,773 | 4/1940 | Foshee | 140/102.5 |
| 2,609,851 | 9/1952 | Hadfield | 81/489 |
| 4,485,852 | 12/1984 | Frazier | 140/102.5 |
| 4,528,800 | 7/1985 | Burns . | |
| 5,829,082 | 11/1998 | Moreira | 81/489 |

FOREIGN PATENT DOCUMENTS

| 05 61 354 | 9/1993 | European Pat. Off. . |
|---|---|---|
| 1 102 138 | 10/1955 | France . |
| 2151236 | 4/1973 | France . |
| 2558334 | 7/1985 | France . |
| 2618861 | 2/1989 | France . |
| 578 127 | 7/1976 | Switzerland . |
| 23 837 | 12/1901 | United Kingdom . |
| 940 313 | 10/1963 | United Kingdom . |
| 2018145 | 10/1979 | United Kingdom . |
| 2094384 | 9/1982 | United Kingdom . |
| 2108190 | 5/1983 | United Kingdom . |

*Primary Examiner*—Robert C. Watson
*Attorney, Agent, or Firm*—Cohen, Pontani, Lieberman & Pavane

[57] ABSTRACT

A mounting clamp for holding together metal sheets and a tool for removing the clamp. The clamp has two legs that define a clamping gap that terminates in a bore hole. The free ends of the legs are provided with bevels with an insertion angle of 20° to 40° relative to the clamping gap. The insertion opening has a width that is slightly larger than the width of the widest stack of sheets to be held by the clamp. The clamping gap has a height that is at least three-times the width of the clamping gap. The diameter of the bore hole is at least one-and-one-half times greater than the width of the clamping gap. The removal tool has an insertion pin arranged at one end of a handle part and can be introduced into the bore hole of the clamp with slight play. The insertion pin is provided with a slit that runs in the longitudinal direction of the handle part.

11 Claims, 2 Drawing Sheets

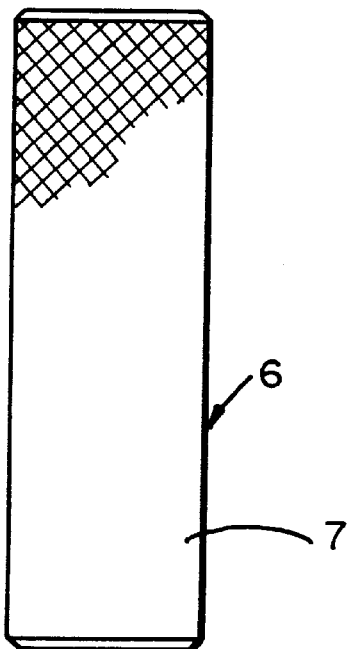
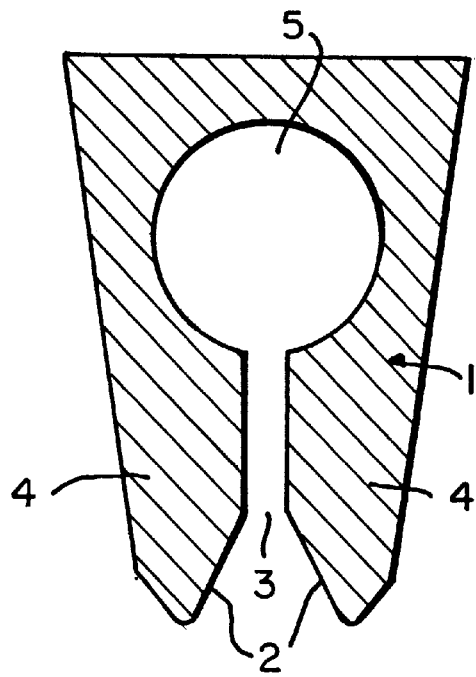
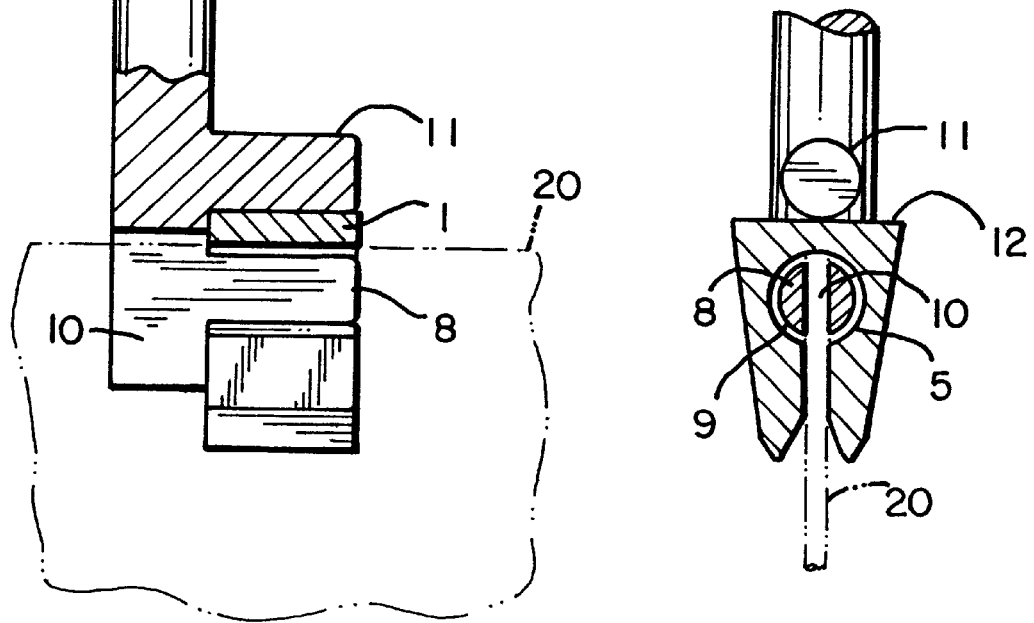

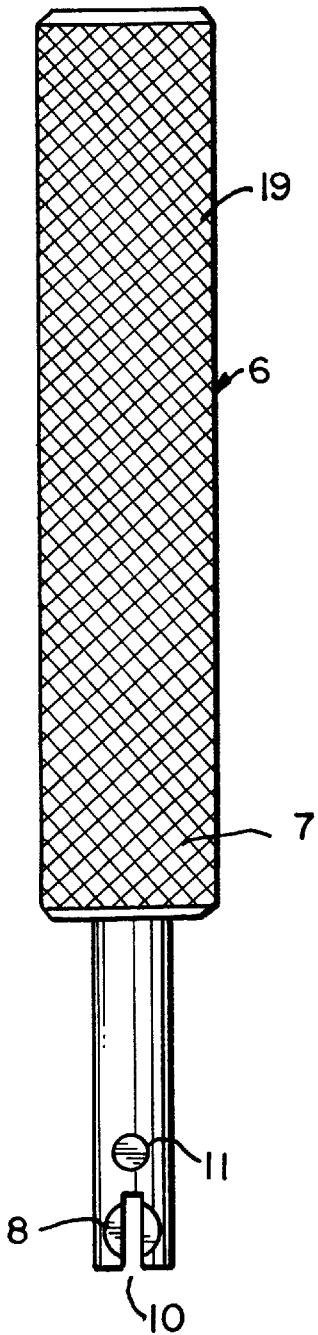
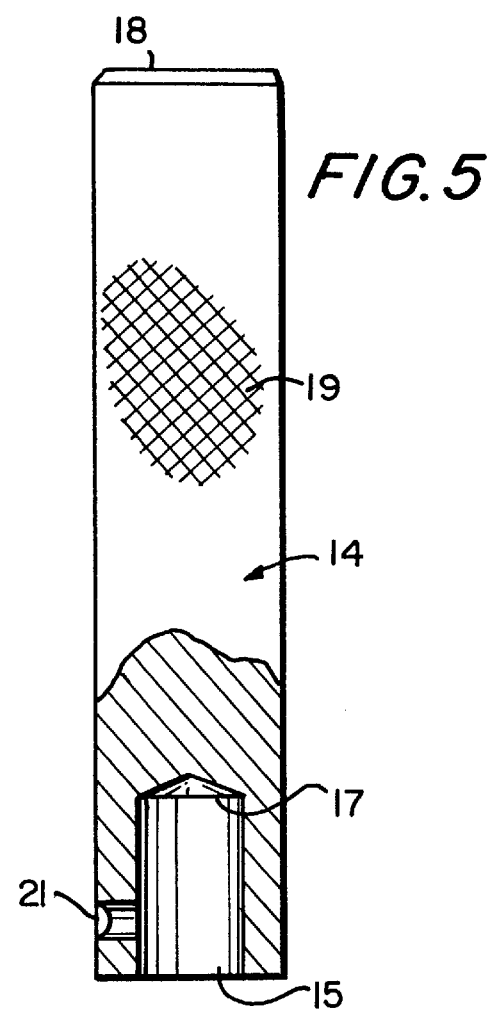
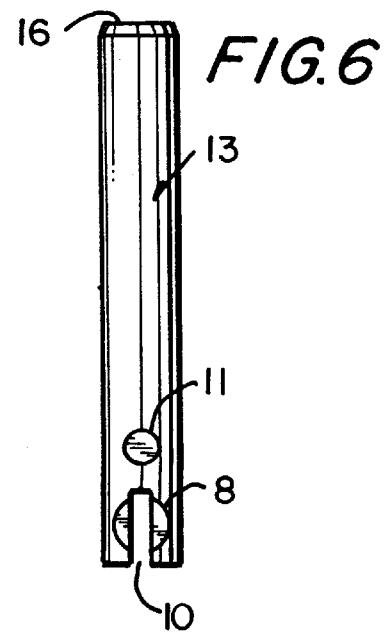

MOUNTING CLAMP FOR HOLDING TOGETHER METAL SHEETS AND A TOOL FOR REMOVING THE CLAMP

This application is a division of U.S. application Ser. No. 08/629,833 filed Apr. 10. 1996 now U.S. Pat. No. 5,934,660.

BACKGROUND OF THE INVENTION

The present invention is directed to a mounting clamp for holding together metal sheets such as those used in vehicle body construction, e.g., for holding together and fixing at least two metal sheets. The invention is also directed to a tool for pulling off or removing the clamp from the sheet metal stack upon completion of a work process, such as welding.

EP 0 561 354 B1 discloses a one-piece clamp for holding together metal sheets. This clamp clamps the metal sheets together in a clamping gap which opens between two clamping legs and terminates in a bore hole. Pull-off gaps are provided at the outer sides of the legs for removing the clamp from the metal sheets. Also, the ends of the legs are rounded to facilitate application of the clamp.

The bore hole at the end of the clamping gap has the function of repeatedly distributing the tensions occurring at the termination of the clamping gap along the circumference and thus preventing possible tension peaks. The pull-off gaps, which are provided at the outer sides on both sides, are intended to facilitate pulling off of the clamp, e.g., they enable pliers to be applied. The clamp is knocked in by means of a hammer and the rounded portions at the ends of the legs facilitate holding of the metal sheets and guide the sheets to the clamping gap in a centered fashion.

A particular disadvantage in the use of this clamp is that an additional tool, for instance pliers, must be used to pull off the clamp. In view of the small working space in which the clamps are sometimes applied, it is often very difficult to use pliers or hammers. Additionally, pliers are difficult to handle since the clamps must be clasped, gripped and pulled by the pliers simultaneously. Thus, the pliers will often slip off the clamp. When applying the clamp in a confined working space using a hammer, the blows of the hammer are transmitted with a rod-shaped extension member, such as a chisel. In such a use it is very common for the rod or chisel to slip from the clamp.

Furthermore, the production costs of known clamps is relatively high due to the features of the clamp construction. Depending on the thickness of the metal sheets, clamps must be manfactured from different semi-finished products or blanks, since the rounded portions of the legs and the clamp bore holes must be worked in differently for different thicknesses of sheet metal.

SUMMARY OF THE INVENTION

Accordingly, it is an object of the present invention to provide a simple and reliable mounting clamp that can be applied and removed in a simple and reliable manner. A further object of the invention is to provide a pull-off tool which can be easily and securely handled to enable the simple and reliable removal of the clamp.

Pursuant to these objects, and others which will become apparent hereafter, one aspect of the present invention resides in a mounting clamp having two legs that define a clamping gap therebetween and terminate in a force distributing bore hole. Each of the legs has insertion facilitating means at an inner leg end on the insertion side. The insertion facilitating means includes straight-edge insertion bevels which enclose an angle of 20° and 40° with the axis of symmetry of the clamping gap forming an insertion opening with an opening angle of 40° to 80°.

The width of the insertion opening is approximately 2 mm greater than the widest sheet metal stack for which the clamp is used. The outer surfaces of the clamp, in particular the legs, are smooth and the clamping gap height correspondes to at least three times the clamping gap width of the clamp for the widest sheet metal stack. The diameter of the bore hole corresponds to at least one-and-one-half times the width of the widest sheet metal stack for which the clamps are provided.

The width of the sheet metal stacks to be fixed depends on the thickness of the metal sheets (e.g., 0.6 mm, 0.8 mm, 1.0 mm, etc.) and the quantity of metal sheets in a sheet metal stack.

The straight-edge insertion bevels of the insertion opening which slope at an angle of 20° to 40° enable a centering of the sheet metal stacks which is substantially improved compared with rounded portions and contribute to a very good guidance of these sheet metal stacks into the clamping gap. The height of the clamping gap, which is at least three times the width of the sheet metal stacks for which the clamps are to be used, ensures adequate clamping of the sheet metal stacks. The features pertaining to the dimensions of the bore hole diameter and the width of the insertion opening make it possible for the first time for clamps with different clamping gap widths, that is, for different thicknesses of sheet metal stacks or sheet metal stacks with different quantities of metal sheets, to be manufactured from a single blank or semi-finished product.

Thus, clamps for sheet metal stacks of varying thickness can be produced from a blank or semi-finished product. For this purpose, clamping gaps which are adapted to the thickness of the various sheet metal stacks need only be worked, e.g., cut or stamped, into the blank or semi-finished product.

The outer surfaces of the clamp, in particular the lateral surfaces of the legs, are smooth. With the pull-off tool of the present invention, the pull-off gaps or other shaping features which were required at the outer surface to improve gripping by pliers for pulling off the clamp are rendered unnecessary.

The pulling-off tool of the present invention has an insertion pin arranged at one end of a handle part of the tool. The insertion pin is designed so that it can be introduced into the bore hole of the clamp with a small amount of play. This pin, which is to be received in the clamp bore hole, is slit centrally and axially in the longitudinal direction of the handle part. When constructed in this way, the insertion pin can be introduced into the bore hole of the clamp when the clamp is placed on the sheet metal stack to the extent that the stack abuts against the stop of the clamp.

Advantageously, the slit is slightly wider than the widest sheet metal stack so that only a pull-off tool for clamps with clamping gaps of different widths, that is, for sheet metal stacks of different widths, is used.

For reasons pertaining to strength, the slit insertion pin advantageously has a cylindrical shape that conforms to the diameter of the clamp bore hole. In view of the need for easy insertion, the diameter of the insertion pin is slightly smaller than the diameter of the clamp bore hole so that there is play between the pin and the bore hole. The insertion pin preferably has a length that corresponds to the thickness of the clamp. Finally, the insertion pin is provided with an insertion bevel at its front insertion end to ensure reliable insertion into the clamp bore hole. A bevel angle of 30° has been found to be desirable.

In another embodiment of the invention, the slit insertion pin is arranged to extend axially at right angles below the handle part. In other words, the pin can be welded on at its end side along the outer surface of the handle part. When the pin is arranged at the outer surface of the handle part, the handle part must be slit in the same manner from the bottom tpward the insertion pin, i.e., the handle part must have the same slit width and at least the same slit depth as the insertion pin.

In a further embodiment of the inventive tool, the tool is configured so that it can be easily used for mounting and sliding on the clamp. The use of the tool as a slide-on tool is particularly beneficial when the available work space is cramped and direct mounting using a hammer is very difficult or impossible. In order to permit the tool to function as a slide-on tool, an additional pin for driving in the clamp is arranged at the handle part above the insertion pin used for pulling off the clamp. The distance between the two pins corresponds to the material thickness of the clamp between the upper edge of the clamp bore hole and the upper clamp surface. In other words, the second pin, namely, the drive-in pin, contacts the upper surface of the clamp when the lower, slit insertion pin is inserted into the bore hole. Obviously, the two pins are arranged parallel to one another. The two pins advantageously lie in a plane with the longitudinal axis of the handle part and are arranged at the handle part at right angles thereto. This arrangement and spacing ensures that the clamp which is held by the tool is secured with respect to rotation relative to the tool. Thus it is ensured that the clamping gap of the clamp and the slit in the handle part and the insertion pin coincide and are aligned with one another. Accordingly, when the pin is driven in it is possible to slide the clamp far enough onto the sheet metal stack to be secured so that the metal sheets contact the upper edge of the bore hole.

In still an additional embodiment of the invention, the distance between the pins is determined so that the mounting force or hammering force occurring when sliding on or driving on the clamp using the inventive tool is transmitted to the clamp by the upper drive-in pin, while the lower insertion pin does not contact the bore hole surface. Because the dimensions of the upper drive-in pin are not determined by the clamp dimensions as is the case with the insertion pin, the upper drive-in pin can be reliably dimensioned in conformity with the mounting force.

It is also possible to construct the tool in two parts, namely, a pull-off projection with a pin and a slot, and a handle. The pull-off projection and the handle are connected in a positive engagement or a frictional engagement in a manner known per se. This two-part construction, on the one hand, makes the tool easy to manufacture and, on the other hand, makes it possible to exchange the handle and in particular the pull-off projection which is subject to considerably more abuse during use and can accordingly be damaged or deformed.

In another embodiment, the surface of the handle is profiled, e.g., knurled or provided with axial grooves, to facilitate gripping of the handle. The upper surface of the handle and handle part is provided with a flat surface so that a hammering tool can be easily used on this surface. Furthermore, the pull-off projection can be simply secured in a pocket bore hole that is worked into the handle. However, the end face of the pull-off projection should contact the base of the pocket bore hole as far as possible or the pull-off projection should have a shoulder by which it can be supported at the handle end.

The various features of novelty which characterize the invention are pointed out with particularity in the claims annexed to and forming part of the disclosure. Form a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

FIG. 1 shows a clamp pursuant to the present invention;

FIG. 2 shows a side view of FIG. 1 with an inserted tool, according to the invention, in partial section;

FIG. 3 shows a top view of the inventive clamp and tool with a sheet metal stack clamped therein;

FIG. 4 shows the inventive tool with a handle part, two pins and a slit;

FIG. 5 shows a two-part construction of the tool handle; and,

FIG. 6 shows the pull-off projection of the tool of FIG. 5.

DETAILED DESCRIPTION OF THE PREFERRED EMBODIMENTS

FIG. 2 shows the inventive clamp 1 having smooth surfaces. Two insertion bevels 2 form an insertion opening that narrows in diameter toward a clamping gap 3 and terminates therein. A force distributing clamp bore hole 5 is also shown. The clamp 1 has two legs 4 which define the clamping gap 3 which terminates at the bore hole 5.

FIGS. 1 and 3 show the clamp 1 engaged by an inventive tool 6. The tool 6 has a handle part 7 on which an insertion pin 8 and a drive-in pin 11 are arranged. The insertion pin 8 is inserted into the bore hole 5 of the clamp 1. In this position there is play 9 between the insertion pin 8 and the surface of the clamp 1 defining the bore hole 5. The insertion pin 8 and the lower end of the handle part 7 have a shared axial slit 10. FIG. 1 shows the required depth and length of the slit 10. The slit 10 is constructed so that the metal sheets 20 that are inserted until they come to a stop in the clamp bore hole 5 do not impede insertion of the insertion pin 8 into the bore hole 5. The drive-in pin 11 contacts the upper surface 12 of the clamp 1 when the clamp 1 is applied to the metal sheets 20. The insertion pin 8 does not transmit mounting force when the clamp 1 is applied to the sheets 20. The drawing clearly shows the manner in which the two pins 8, 11 must be spaced relative to one another to allow the tool 6 to easily slide in or on the clamp 1, and so that the drive-in pin 11 transmits the mounting force without the insertion pin 8 contacting the surface of the clamp bore hole 5.

As can be seen in FIG. 3, the drive-in pin 11 also prevents rotation of the clamp 1 around the insertion pin 8 so that the slit 10 and the clamping gap 3 are always aligned so that the metal sheets 20 can be pushed through as far as the upper edge of the clamp bore hole 5 and the clamp 1 can be slid over the metal sheets 20 until they come to stop in the bore hole 5.

FIG. 4 shows the tool 6 separate from the clamp 1. The two pins 8, 11 are arranged at the handle part 7 of the tool 6. In the illustrated embodiment, the pins 8, 11 are arranged so as to project out from the surface of the handle part 7 at right angles. The slit 10 ends in the handle part 7 somewhat above the insertion pin 8 and is open at the bottom. The handle part 7 has a gripping region that is provide with knurling 19 so that the handle part 7 can be easily gripped.

FIGS. 5 and 6 show the tool 6 with a two-piece construction, namely a handle 14 and a pull-off projection 13. The handle 14 is shown in FIG. 5, while the pull-off projection 13, with the two pins 8, 11 and the slit 10, is shown in FIG. 6. A receptacle opening 15 shaped as a pocket bore hole is provided in the handle 14 for receiving the pull-off projection 13. The diameter of the pocket bore hole opening 15 allows upper end face 16 of the pull-off projection 13 to be inserted up to the base 17 of the pocket bore hole receptacle opening 15. A threaded pin or stud screw can be screwed into the handle 14 via a bore hole 21 to secure the pull-off projection 13 in the handle 14. The upper end side of the handle 14 has a flat, planar surface 18 for receiving blows from a hammering tool. Also, the outer surface of the handle is profiled, e.g., in the form of a knurling 19, to facilitate handling of the handle 14.

The invention is not limited by the embodiments described above which are presented as examples only but can be modified in various ways within the scope of protection defined by the appended patent claims.

I claim:

1. A tool for pulling off a mounting clamp holding together a stack of metal sheets, comprising: a longitudinal handle part having a first end; and an insertion pin mounted to the first end of the handle part so as to be at a right angle to the handle part, the insertion pin being configured to be introduceable into a bore hole in the clamp with play, the insertion pin having an axial central slit that runs completely through the pin in the longitudinal direction of the handle part and an axial direction of the pin.

2. A tool according to claim 1, wherein the slit is configured to be wider than a widest stack of metal sheets which can be held by the clamp.

3. A tool according to claim 1, wherein the insertion pin is cylindrical and has a length that corresponds approximately to a thickness of the clamp.

4. A tool according to claim 1, wherein the first end has an end face, the insertion pin being arranged at the end face of the handle part.

5. A tool according to claim 1, wherein the handle part has a two-part construction including a handle and a pull-off projection, the insertion pin being connected to the pull-off projection, the pull-off projection and the handle being connected to one another.

6. A tool according to claim 5, the handle having one end with a receptacle opening formed as an inner pocket bore hole having a base, the pull-off projection having an upper end face and being insertable into the receptacle opening so that the upper end face contacts the base, the handle having a second end opposite the one end, the second end having a planar surface, the handle further having a profiled outer surface.

7. A tool according to claim 6, wherein the outer surface of the handle is knurled.

8. A tool for pulling off a mounting clamp holding together a stack of metal sheets, comprising:

a longitudinal handle part having a first end; and an insertion pin mounted to the first end of the handle part so as to be at a right angle to the handle part, the insertion pin being configured to be introduceable into a bore hole in the clamp with play, the insertion pin having an axial central slit that runs in the longitudinal direction of the handle part, the insertion pin being arranged to project out from an outer surface of the handle part at a right angle, the slit being arranged in both the insertion pin and the handle part.

9. A tool for pulling off a mounting clamp holding together a stack of metal sheets, comprising:

a longitudinal handle part having a first end;

an insertion pin mounted to the first end of the handle part so as to be at a right angle to the handle part, the insertion pin being configured to be introduceable into a bore hole in the clamp with play, the insertion pin having an axial central slit that runs in the longitudinal direction of the handle part; and a drive-in pin mounted to the handle part parallel to and at a distance from the insertion pin, the distance between the two pins on an outer surface being only slightly greater than a material thickness of the clamp between an upper edge of the clamp bore hole and an upper side of the clamp.

10. A tool according to claim 9, wherein both pins and the handle part have longitudinal axes that lie in a single plane.

11. A tool according to claim 9, wherein the pins are configured so that the play of the insertion pin in the bore hole and the distance between the pins are adapted to one another so that the drive-in pin contacts an upper surface of the clamp and the insertion pin does not contact lower surfaces of the bore hole when the clamp is arranged on the tool.

* * * * *